United States Patent [19]

Drake et al.

[11] 4,428,774
[45] Jan. 31, 1984

[54] CORROSION INHIBITING PAINT COMPOSITIONS

[75] Inventors: Cyril F. Drake, Harlow; Alan Maries, London; Paul F. Bateson, Duxford, all of England

[73] Assignee: ITT Industries, Inc., New York, N.Y.

[21] Appl. No.: 384,299

[22] Filed: Jun. 2, 1982

[30] Foreign Application Priority Data

Jun. 2, 1981 [GB] United Kingdom ............... 8116816
Jun. 2, 1981 [GB] United Kingdom ............... 8116817

[51] Int. Cl.³ .................................................. C09D 5/08
[52] U.S. Cl. .................... 106/14.39; 428/458; 524/414; 524/417; 524/432
[58] Field of Search ............ 501/45; 106/14.12, 14.21, 106/14.25, 14.33, 14.39, 292, 306; 423/306; 524/414, 417, 432; 428/458

[56] References Cited

U.S. PATENT DOCUMENTS

| | | | |
|---|---|---|---|
| 3,341,453 | 9/1967 | Ralston | 501/45 |
| 4,153,465 | 5/1979 | Hund et al. | 106/14.25 |
| 4,210,575 | 7/1980 | Drake | 260/42.52 |
| 4,337,092 | 6/1982 | Hestermann et al. | 106/14.39 |
| 4,346,184 | 8/1982 | Drake | 523/451 |
| 4,350,675 | 9/1982 | Drake | 424/1 |

FOREIGN PATENT DOCUMENTS 904861 8/1962 United Kingdom.
915512 1/1963 United Kingdom.

Primary Examiner—Lorenzo B. Hayes
Attorney, Agent, or Firm—James B. Raden; Harold J. Holt

[57] ABSTRACT

A corrosion inhibiting paint comprises a resin vehicle containing a water soluble glass which, on dissolution in water, releases corrosion inhibiting materials. The glass itself, or the combination of the glass and the paint, are so constituted that conditions of low acidity, i.e. above pH 4.0, are presented to a metal surface to which the print is applied. The glass may contain phosphorus pentoxide as the glass forming oxide together with one or more Group IIA or IIB metal oxides as the glass modifying oxide or oxides.

13 Claims, 3 Drawing Figures

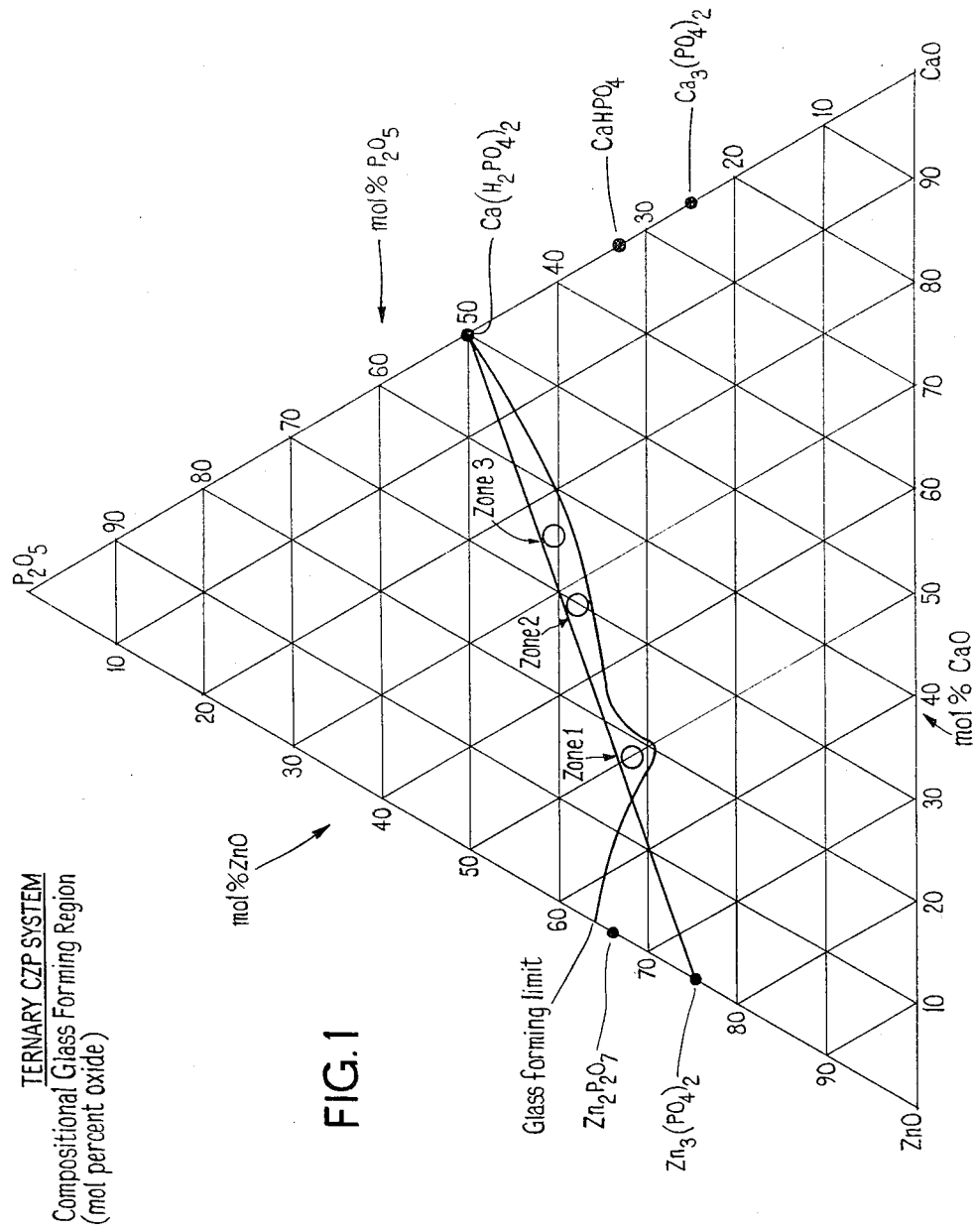

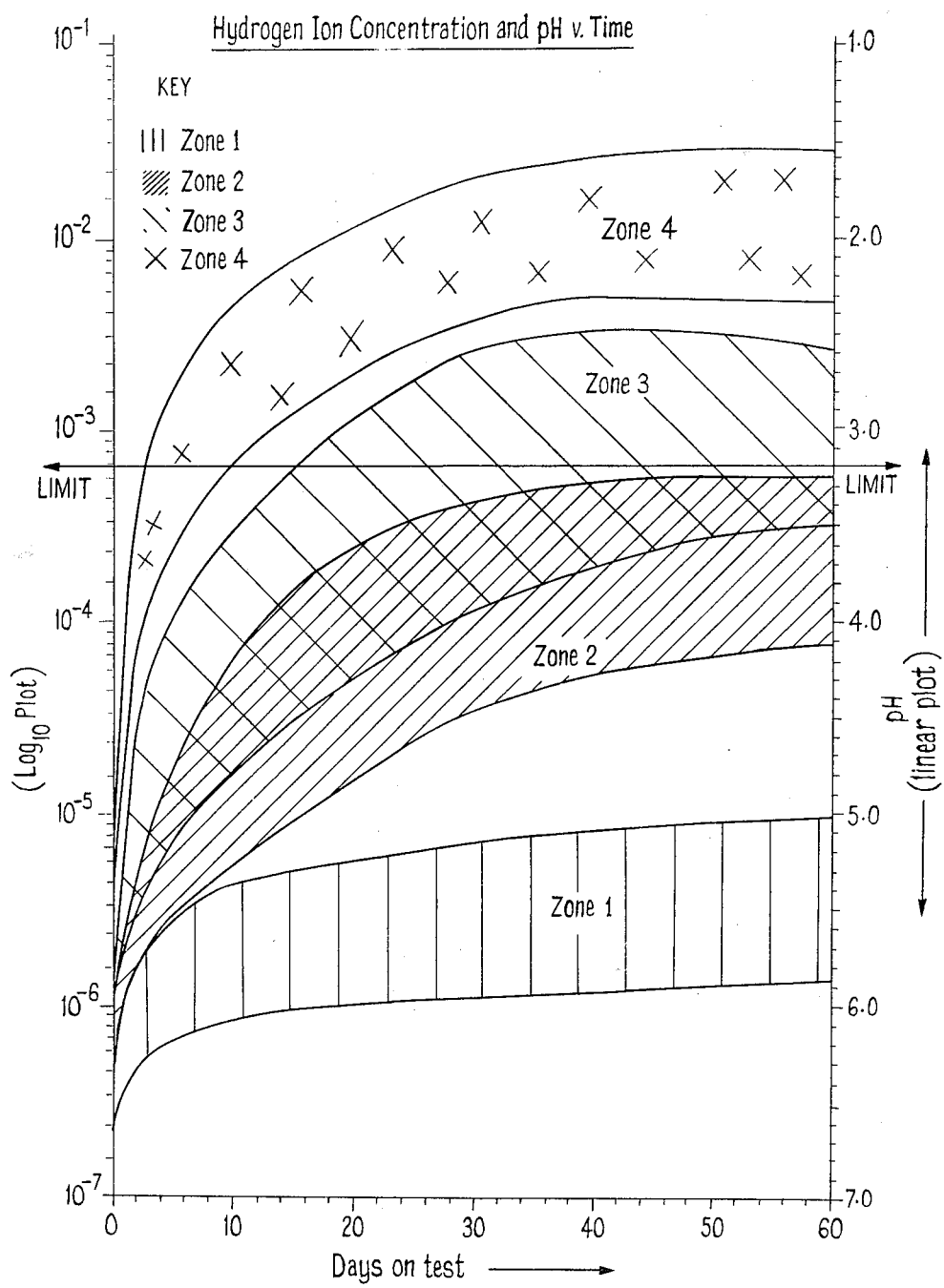

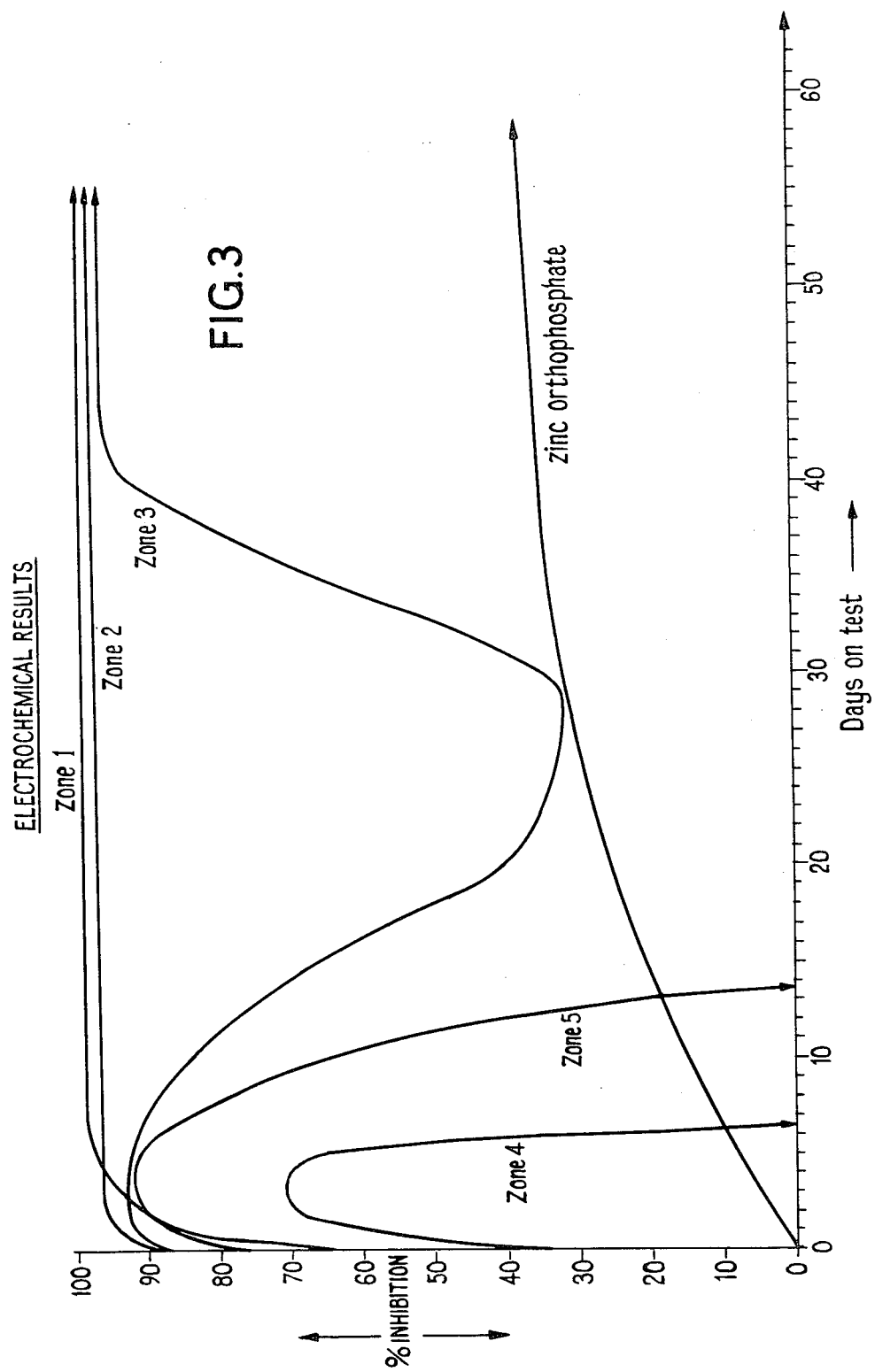

CORROSION INHIBITING PAINT COMPOSITIONS

This invention relates to compositions for inhibiting corrosion of a ferrous metal surface to which they are applied and to paint formulations containing such compositions.

One of the major problems involved in the use of metals as structural materials is that of corrosion of the metal, ferrous metals being particularly susceptible. The mechanism of corrosion is incompletely understood, but it is well known that the process is accelerated under hostile conditions, typically in industrial and marine environments. The standard technique for reducing corrosion is to apply to the metal surface a primer coating containing one or more corrosion inhibiting materials. Such primer coatings generally comprise a resinous binding medium in which finely ground pigments are dispersed, the purpose of these pigments being either to provide opacity and color or to provide corrosion inhibition, these latter being known as active pigments. The most commonly used active pigments are red lead and calcium plumbate, but these materials are highly toxic. Zinc chromate is also employed as a corrosion inhibitor, but is does not possess the level of performance of the lead pigments and can also cause colour bleeding of a subsequent paint coat. Furthermore hexavalent chromium salts are suspected of having carcinogenic activity.

More recently zinc phosphate has been employed as a non-toxic alternative to lead and chromate pigments. Compositions employing this material are described in U.K. Patent Specifications Nos. 904,861 and 915,512. It is claimed that this material is almost as effective as the previously employed toxic pigments, but its performance is poor in certain binder media and under conditions of exposure where the atmospheric sulphur dioxide level is low, typically marine conditions. Furthermore where a primed steel surface is to be welded, the use of zinc phosphate paints should preferably be avoided. The intense heat generated in the welding process can cause vaporization of the paint producing toxic fumes of zinc oxide and/or free zinc.

The aforementioned U.K. Patent Nos. 904,861 and 915,512 also describe the use of calcium phosphate (tricalcium phosphate, calcium hydrogen phosphate and mono-calcium dihydrogen phosphate) which avoid the toxicity problem experienced with zinc based paints. However these calcium salts do not possess the optimum values of water solubility and pH for effective corrosion inhibition over a range of paint media and environmental conditions. Also it will be clear that, as the compounds are stoichiometric, these properties are not subject to control.

In British patent applications Nos. 23790/77 (U.S. Pat. No. 4,210,575) and 7,939,544 (U.S. Pat. No. 4,346,184) describe the use, as anti-corrosion materials, of various zinc alumino-phosphate glass pigments. These materials are more effective than the conventional zinc orthophosphate pigments in that they provide zinc and phosphate ions at predetermined optimum rates and ratios under a variety of corrosion conditions. Further corrosion inhibiting compositions based on the calcium oxide/phosphorus pentoxide glass system are described in British application No. 810,776 (copending U.S. patent application Ser. No. 251,020 filed Apr. 3, 1981).

Whilst paints incorporating these corrosion inhibiting glass compositions are considerably more effective than the conventional zinc phosphate paints we have found that, under certain conditions, the somewhat acid nature of these glasses causes dissolution of a small thickness of metal from the surface to which the paint is applied. For many applications, when the paint is applied to a relatively thick body of metal this small metal loss is of no consequence. However where the surface to be protected comprises a thin sheet, e.g. a vehicle body panel, the metal loss may become significant and thus undesirable.

An object of the present invention is to minimize or to overcome this disadvantage.

We have now discovered that certain glass materials provide even more effective anti-corrosion pigments than those previously described.

We have also found that a paint formulation may be adapted to complement a particular glass composition to provide pH conditions that enhance corrosion inhibition in that the risk of acid build up and consequent attack of a metal surface.

We have also found that glass compositions described herein can be used in a very finely divided form, typically below 10 microns in average diameter, to produce a paint having a sufficiently high quality finish for use in applications where a cosmetic effect is required in addition to the corrosion protection provided by the paint. Such applications include the corrosion protection of vehicle bodies.

According to one aspect of the present invention there is provided a corrosion inhibiting paint composition comprising a resin vehicle and a water soluble corrosion inhibiting glass dispersed in the resin, characterised in that the solution pH, as hereinafter defined, of the glass is greater than 3.2.

According to another aspect of the invention there is provided a corrosion inhibiting material including a glass composition selected from the group comprising the glasses of Zone 1, Zone 2 or Zone 3 as hereinafter defined.

According to a further aspect of the invention there is provided a corrosion inhibiting paint composition comprising a resin vehicle, a water soluble corrosion inhibiting acidic glass dispersed in the resin, characterized in that an alkaline material is dispersed in or incorporated in the resin whereby the acidity of the glass resin combination is maintained below 3.2.

It is thought that the rate at which a ferrous metal surface is dissolved by phosphate type anticorrosive agents is related to the pH condition at the metal surface. The mechanism whereby corrosion inhibition is effected is not well understood but it is believed that the initial step is the reaction of the metal surface with phosphate ions released by dissolution of the glass to form a coherent layer of an iron phosphate. This phosphate layer then protects the metal surface against subsequent corrosive attack. The integrity of this protective film is enhanced by the presence of Group IIA and/or IIB metal ions also released by dissolution of the glass. These ions are believed to form complex phosphates on the ferrous metal surface.

The effectiveness of this phosphate layer in preventing corrosion is determined by a number of factors many of which are interdependent. In particular the pH conditions and the phosphate ion concentration adjacent the metal surface together determine the rate at which the phosphate film is dissolved away and the rate at which it is replenished by conversion of more ferrous metal into the corresponding phosphate. In particular we have found that dissolution of the film with subsequent ferrous metal attack becomes measurable for active pigments having a solution pH value below 4.3, appreciable below 4.0, and becomes rapid when this pH value is less than 3.2.

The solution pH value is defined as the solution pH obtained when 0.5 g of the active pigment, typically a glass, having a particle size in the range 500 to 710 microns is dispersed in 75 ml deionized water at 25° C. The pH of the resultant solution is measured at 24 hr intervals until a steady value is obtained. This period can be as much as 50 to 60 days.

The pH conditions pertaining at the surface of a metal in contact with a paint wherein the active corrosion inhibiting agent is a water soluble glass may be controlled in a number of ways. Firstly the glass composition may be selected and that its ultimate solution pH remains below the initial value of 3.2. This may be done by adjustment of the various glass forming and glass modifying constituents, and in particular we have found for example that glass containing zinc oxide, calcium oxide and phosphorus pentoxide as their principle constituents satisfy this requirement if the phosphorus pentoxide content is maintained below 40 mole percent.

A further technique is selection of the paint medium in which the glass is dispersed. An alkaline material dispersed in, or incorporated in, the paint foundation permits the use of relatively acid glasses which, in the absence of such a neutralising material, could provide an inferior degree of corrosion inhibition.

In one embodiment of the invention anticorrosion paints may be made wherein the active pigment of the paint, comprises a glass whose solution pH is above 3.2 and preferably above 4.0. Typically the glass may comprise phosphorus pentoxide as the glass forming oxide together with one or more glass modifying oxides selected from Group IIA and Group IIB metal oxides. The pH of the glass is determined by the relative proportions of the constituent oxides, and in particular we have found that glasses containing less than 40 mole % phosphorus pentoxide have suitable solution pH values.

The dissolution rate of the glass is also determined by the relative proportions of glass forming oxides and glass modifying oxides. This rate can be further adjusted by the incorporation of further glass modifying oxides such as alumina. The various techniques of glass dissolution rate and solution pH control are more fully described in British application No. 7,930,041 (U.S. Pat. No. 4,350,675).

The glasses may be formed by fusing mixtures of the constituent oxide, or precursors thereof, for a sufficient period of time to obtain a homogeneous melt which is then cast into cold water or on to a cold steel plate. The solidified material is crushed and ground to a particle size typically in the range 10 to 100 microns and is then dispersed in a paint resin as part of the total solid pigment. Advantageously the solid pigment content of the paint comprises e.g. 40 vol % and of this a total of typically 20 weight % may comprise the corrosion inhibiting glass material.

In particular we have found that particular glass composite ranges, shown in FIG. 1 of the accompanying drawings as Zone 1 and Zone 2, have a solution pH/time profile that has been found to provide corrosion protection without acid attack. Further, some glasses from a further zone, Zone 3, also fall within this pH limit. When these glasses are contacted with water the solution pH size falls rapidly to a value between 6 and 4 and then falls more slowly approaching, in some cases a value of 3.2. We have found that glass compositions whose ultimate solution pH is above this limit provide corrosion protection of metal surfaces without the associated problem of attack of that surface by the dissolution product. The solution pH/time profiles of glasses falling within zones 1, 2 and 3 are illustrated in FIG. 2. For compositive purposes glasses from a further zone, Zone 4, are included.

A number of glasses have been prepared for each of the zones shown in FIG. 1. It will be appreciated that, due to evaporation of some constituents, particularly phoshorus pentoxide, during the fusing process, it is difficult to define a previous composition. We have however defined target compositions from each of these zones, these target compositions being as follows (mole %):

|        | ZnO  | CaO  | P$_2$O$_5$ |
|--------|------|------|------|
| Zone 1 | 50.0 | 18.0 | 32.0 |
| Zone 2 | 32.0 | 30.0 | 38.0 |
| Zone 3 | 24.5 | 35.0 | 40.5 |

The molar composition ranges within each zone are as follows:

|        |           |              |
|--------|-----------|--------------|
| Zone 1 | ZnO       | 49.8 to 50.4 |
|        | CaO       | 18.0 to 18.5 |
|        | P$_2$O$_5$ | 31.4 to 31.7 |
| Zone 2 | ZnO       | 31.8 to 32.3 |
|        | CaO       | 29.0 to 29.8 |
|        | P$_2$O$_5$ | 38.2 to 38.7 |
| Zone 3 | ZnO       | 23.9 to 26.3 |
|        | CaO       | 33.6 to 35.0 |
|        | P$_2$O$_5$ | 40.0 to 41.3 |

The various compositions, together with their dissolution rates, are listed in Tables 1, 2 and 3 below:

TABLE 1

ZONE 1 (Pigment P)

| PREPARATION | | ANALYTICAL COMPOSITION mol % | | | Dissolution Rate |
|---|---|---|---|---|---|
| °C. | hr | ZnO | CaO | P$_2$O$_5$ | mg cm$^{-2}$ hr$^{-1}$ |
| 950 | 1 | 50.4 | 18.0 | 31.6 | 0.023 |
| 1050 | 1 | 49.8 | 18.5 | 31.7 | 0.032 |
| 1050 | 1 | 50.1 | 18.5 | 31.4 | 0.034 |
| 1050 | 1 | 49.8 | 18.5 | 31.7 | 0.042 |
| 950 | 4 | 50.3 | 17.6 | 32.1 | 0.028 |
| 950 | 4 | 49.7 | 18.6 | 31.7 | 0.021 |
| 1050 | 4 | 49.6 | 18.4 | 32.0 | 0.027 |
| 1050 | 4 | 51.0 | 17.2 | 31.8 | 0.036 |
| 950 | 16 | 50.1 | 17.9 | 32.0 | 0.021 |
| 1050 | 16 | 50.1 | 17.9 | 32.0 | 0.027 |
| 950 | 64 | 50.2 | 17.8 | 32.0 | 0.023 |
| 1050 | 64 | 49.9 | 18.6 | 31.5 | 0.024 |

TABLE 2

ZONE 2 (Pigment N)

| PREPARATION | | ANALYTICAL COMPOSITION mol % | | | Dissolution Rate |
|---|---|---|---|---|---|
| °C. | hr | ZnO | CaO | P$_2$O$_5$ | mg cm$^{-2}$ hr$^{-1}$ |
| 950 | 1 | 32.3 | 29.5 | 38.2 | 0.060 |
| 1050 | 1 | 32.1 | 29.2 | 38.7 | 0.098 |
| 1050 | 1 | 31.8 | 29.8 | 38.4 | 0.055 |
| 1050 | 1 | 32.3 | 29.0 | 38.7 | 0.098 |

TABLE 2-continued

ZONE 2 (Pigment N)

| PREPARATION | | ANALYTICAL COMPOSITION mol % | | | Dissolution Rate |
|---|---|---|---|---|---|
| °C. | hr | ZnO | CaO | $P_2O_5$ | mg cm$^{-2}$ hr$^{-1}$ |
| 950 | 4 | 31.9 | 29.7 | 38.4 | 0.056 |
| 1050 | 4 | 32.6 | 29.3 | 38.1 | 0.043 |
| 1050 | 4 | 31.6 | 30.7 | 37.6 | 0.073 |
| 1050 | 4 | 32.0 | 30.4 | 37.6 | 0.052 |
| 1050 | 4 | 31.8 | 30.7 | 37.5 | 0.052 |
| 950 | 16 | 32.3 | 29.7 | 38.0 | 0.062 |
| 950 | 16 | 31.8 | 30.5 | 37.7 | 0.053 |
| 1050 | 16 | 31.8 | 30.5 | 37.7 | 0.057 |
| 950 | 64 | 32.0 | 29.6 | 38.4 | 0.83 |
| 1050 | 64 | 31.5 | 30.2 | 38.3 | 0.050 |
| 1050 | 64 | 32.1 | 30.3 | 37.6 | 0.78 |

TABLE 3

ZONE 3 (Pigment R)

| PREPARATION | | ANALYTICAL COMPOSITION mol % | | | Dissolution Rate |
|---|---|---|---|---|---|
| °C. | hr | ZnO | CaO | $P_2O_5$ | mg cm$^{-2}$ hr$^{-1}$ |
| 950 | 1 | 23.9 | 34.8 | 41.3 | 0.056 |
| 950 | 1 | 24.9 | 34.4 | 40.7 | 0.078 |
| 1050 | 1 | 25.0 | 35.0 | 40.0 | 0.067 |
| 1050 | 1 | 26.3 | 33.6 | 40.1 | 0.055 |
| 1050 | 1 | 24.7 | 34.8 | 40.5 | 0.073 |
| 950 | 4 | 24.8 | 34.4 | 40.9 | 0.061 |
| 950 | 4 | 24.6 | 35.4 | 40.0 | 0.090 |
| 950 | 4 | 25.2 | 33.9 | 40.9 | 0.073 |
| 1050 | 4 | 24.9 | 34.5 | 40.6 | 0.087 |
| 950 | 16 | 25.8 | 33.6 | 40.6 | 0.050 |
| 1050 | 16 | 25.1 | 34.6 | 40.3 | 0.063 |
| 950 | 64 | 24.5 | 34.7 | 40.8 | 0.074 |
| 1050 | 64 | 25.6 | 34.0 | 40.4 | 0.070 |

We have found that the corrosion inhibiting effect of a glass composition can be tested electrochemically.

We have employed a standard test procedure wherein the glass is allowed to dissolve in a test cell containing aqueous potassium chloride (to provide electrical conductivity, and provided with a mild steel electrode and a non-reactive reference electrode. Corrosion inhibiting ions released by dissolution of the glass produce an insulating protective film on the mild steel electrode. The quality of this film, i.e. the degree of corrosion inhibition, is determined by applying a ramp voltage to the mild steel electrode and determining at which part of the ramp breakdown of the film occurs and current begins to flow. 100% inhibition is defined as a theoretically perfect film which allows no current to flow.

Measurement on glasses from zones 1, 2 and 3 have been performed and the results are summarized in FIG. 3. Two other relatively acid glass pigments, Zone 4 and Zone 5, and zinc orthophosphate (a conventional corrosion inhibitor) have been included for comparison. As can be seen Zone 1 and Zone 2 glasses provide a very high level of inhibition, i.e. although the Zone 3 glasses do not provide the initial high degree of corrosion protection effected by the Zone 1 and 2 glasses the inhibiting effect increases to a satisfactory level over an extended period.

In a further embodiment of the invention a paint may be formulated using a corrosion inhibiting glass having a solution pH less than 3.2, the paint also incorporating a neutralising agent to compensate for this relatively high acidity of the active material. This neutralising agent is alkaline in nature and may either comprise a low solubility stoichiometric compound such as calcium carbonate, or a second water soluble glass having a relatively high solution pH. The function of the neutralising agent is to increase the pH adjacent a metal surface to which the paint is applied and in the presence of moisture. Thus, even over an extended period, ingress of moisture does not result in a solution pH adjacent the metal surface of less than 3.2.

The glasses may be formed and dispersed in a paint resin as previously described, the neutralizing agent then forming a further part of the total solid pigment. This use of a neutralizing agent has a further advantage in that the tendency of the paint to blister can be reduced. It is known that if the concentration of dissolved material in a moist environment below a paint film is excessive osmosis takes place further water will diffuse through the paint film. In some instances the osmotic pressure will be sufficiently high to blister the paint film. We have found that the electrolyte concentration below such a paint film can be kept as low as is consistent with effective corrosion protection by matching the nature and dissolution rates of the active pigment and the neutralizing agent in the paint. Thus the dissolution rate of the active glass pigment can be matched, using the techniques described in British application No. 7,930,041 (U.S. Pat. No. 4,350,675) to the dissolution rate of the neutralizing agent such that the rate at which the active glass dissolves corresponds to the rate at which the dissolution products are removed by the neutralising agent.

We prefer to employ alkyd resins (typically a short oil alkyd in xylene) for preparing paints from the glasses described herein but it will be appreciated by those skilled in the art that other conventional resins or binders can be employed, e.g. epoxy resins, acrylics, or chlorinated rubbers.

For structural applications in which thick coatings are used, i.e. 50 to 100 microns or more in thickness, the glass should be comminuted to a final size in which the majority of the particles by weight are less than 60 microns in average diameter. In other applications, e.g. in the corrosion protection of vehicle bodies the glass particle size may be below 15 microns and preferably below 10 microns in average diameter.

Unlike prior corrosion resistant compositions the glass compositions described herein are essentially colourless. Thus they may be used in paint compositions as the sole pigment or together with the desired final colouring pigment. As such, a single coating of the paint composition will in many instances be adequate for both corrosion resistance and final color. Thus the paint compositions described herein may be the sole paint coating on a metal surface.

We claim:

1. In a paint composition adapted to inhibit corrosion of a metal surface to which it is applied, the composition including a glass material dispersed in a resin carrier, said glass material comprising phosphorus pentoxide as the glass forming oxide and at least one glass modifying oxide selected from the group consisting of oxides of a metal of Group II A and Group II B of the periodic table, the composition of the glass being such that when the glass is contacted with water, phosphate ions and the metal ions of the glass modifying oxide leach into solution;

the improvement comprising, as said glass material, a glass having a solution pH greater than 3.2 and selected from at least one of the three groups of glasses having the following molar compositions:

| | | |
|---|---|---|
| Group I | ZnO | 49.8 to 50.4 |
| | CaO | 18.0 to 18.5 |
| | $P_2O_5$ | 31.4 to 31.7, |
| Group II | ZnO | 31.8 to 32.3 |
| | CaO | 29.0 to 29.8 |
| | $P_2O_5$ | 38.2 to 38.7 |
| and Group III | ZnO | 23.9 to 26.3 |
| | CaO | 33.6 to 35.0 |
| | $P_2O_5$ | 40.0 to 41.3. |

2. The corrosion inhibiting paint composition as claimed in claim 1 characterized in that the phosphorus pentoxide content of the glass is less than 40 mole %.

3. The corrosion inhibiting paint composition as claimed in claim 1 characterized in that the glass material comprises a powder having an average particle size of less than 60 microns.

4. The corrosion inhibiting paint composition as claimed in claim 1 characterized in that the solution pH of the glass is greater than 4.0.

5. The corrosion inhibiting paint composition of claim 1 including an alkaline material to neutralize acid substances released by dissolution of the glass.

6. The corrosion inhibiting paint composition as claimed in claim 5 characterized in that said alkaline material is a further water soluble glass.

7. The corrosion inhibiting paint composition as claimed in claim 5 characterized in that said alkaline material is calcium carbonate.

8. The corrosion inhibiting paint composition as claimed in claim 1 characterized in that said corrosion inhibiting glass includes alumina.

9. The corrosion inhibiting paint composition as claimed in claim 1 characterized in that said glass has an average particle size of less than 10 microns.

10. The corrosion inhibiting paint composition as claimed in claim 1 characterized in that said resin as a short oil alkyd resin.

11. A method of treating a metal surface including coating the surface with a paint composition as claimed in claim 1.

12. A steel structure coated with a paint as claimed in claim 1.

13. A vehicle body coated with a paint as claimed in claim 1.

* * * * *